United States Patent Office 3,198,710
Patented Aug. 3, 1965

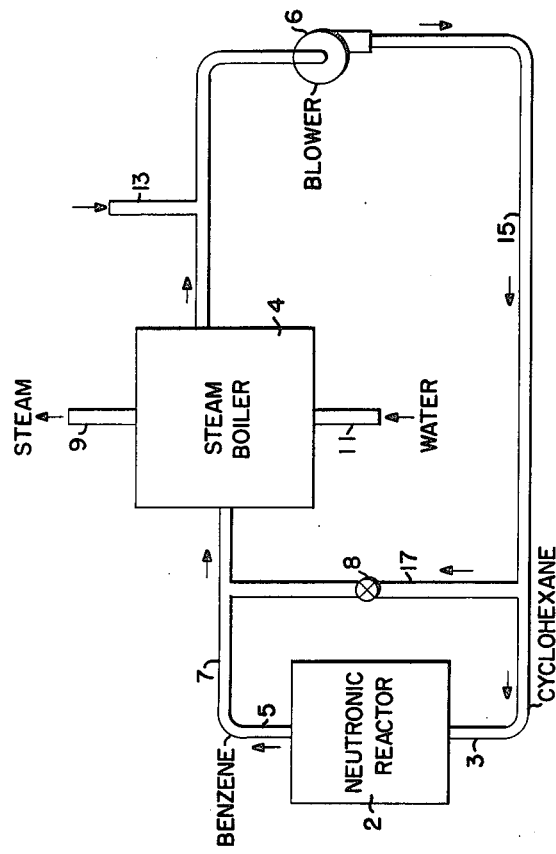

3,198,710
REACTOR COOLANT SYSTEM
Robert B. Long, Wanamassa, N.J., assignor to Esso Research and Engineering Company, a corporation of Delaware
Filed Nov. 12, 1958, Ser. No. 773,347
12 Claims. (Cl. 176—39)

This invention relates to neutronic reactors and to methods for removing heat from neutronic reactors for use in the generation of power. Particularly, the invention relates to a method for removing heat from a neutronic reactor by using a fluid heat-transfer medium capable of undergoing an endothermic chemical reaction on the surface or in the vicinity of the fuel elements of a reactor core. More particularly the invention relates to transferring heat from a neutronic reactor by carrying out an endothermic dehydrogenation process within the reactor and then regenerating the reactant by hydrogenating the reactive material of the fluid cooling medium outside the reactor.

The major limit to the power level at which neutronic reactors can be operated is the rate at which heat can be removed from the reactor fuel elements. Conventionally, heat developed by the fission process is recovered in its most useful form by circulating a fluid heat-transfer medium through the nuclear reactor. This coolant is thereafter used in the generation of power. For purposes of greatest efficiency and economy it is desirable to run a neutronic reactor at very high temperatures in the order of 700° to 1,000° F. It is also desirable that the circulating heat exchange medium have high heat absorbing capacity so that the smallest possible amount of circulating liquid material can be employed. Typically, water has been employed as a reactor coolant.

It has now been found that the catalytic dehydrogenation of naphthenes to make aromatics can be utilized in a novel manner to remove heat in a neutronic reactor cooling process. In a preferred process dehydrogenation of cyclohexane in an atmosphere containing excess hydrogen and some benzene is used with surprising efficiency to cool a nuclear reactor in accordance with this invention. This is accomplished by dehydrogenating the cyclohexane in the vicinity of fuel elements which have been supplied with a surface coating of catalyst. Suitable catalysts are surface coatings of platinum, palladium, nickel, or platinum-alumina, and the like. A particular advantage of this process is that the heat is removed directly from the fuel elements or fuel assembly.

Preferably, neutronic reactor cooling according to the method of the present invention is employed at reactor temperatures in the range of from 700° to 1,000° F. and above. Temperatures within this range are most advantageously employed when neutronic reactors are operated for power generation. The novel hydrogen-hydrocarbon cooling system has the advantage of being non-corrosive to reactor materials of construction, whereas water and some other reactor coolants that are presently being used at low temperatures cannot be utilized at these high temperatures due to very serious corrosion problems. Furthermore, the components of the novel coolant system are gases at reactor conditions and any desired pressure up to, for example, 500 p.s.i.g. or more can be used. Preferably, the dehydrogenation catalyst for the endothermic reaction is placed on the surface of the fuel elements themselves and thus heat can be removed directly from each fuel element to the adsorbed material on the surface. Therefore, the overall heat transfer coefficient of the present process is excellent, since limiting gas film effects are avoided. By means of the present discovery heat in the order of about 1200 B.t.u. per pound of cyclohexane can be removed from an operating neutronic reactor.

Briefly, the present invention provides a method for removing heat from a neutronic reactor including a reaction core, comprising an assembly of fissile material in an amount sufficient to sustain a nuclear fission reaction, and conduit means for supplying fluid cooling medium to and removing cooling medium from the reaction core. Such method comprises using an assembly of fissile material the surface of which has been coated with a suitable dehydrogenation catalyst, or first coating the surface, and supplying a cooling medium comprising cyclohexane to the core to cool the fissile material whereby cyclohexane is catalytically converted to benzene. Thereafter the benzene produced is withdrawn from the core. If desirable a further step can be employed which involves the regeneration of the cyclohexane outside the core by reacting benzene in the presence of a hydrogenation catalyst. The principal advantage of this cooling system over reactor cooling by boiling water (with, for example, 600–700° F. product steam) lies in the fact that by the present method in the range of 2.5 to 10 times more heat can be removed per pound of fluid circulated. Further, a lower coolant pressure is required and heat can be directly removed from fuel elements by catalytic surface reactions. At the same time, the novel method takes advantage of the fact that an increase in reactor fuel temperature increases the dehydrogenation rate and thus the heat removal rate, whereas when conventional water cooling is employed, vapor bubbles due to hot spots decrease the cooling rate at higher temperatures.

In a preferred embodiment of the present invention the effluent coolant from a neutronic reactor, containing mostly benzene and hydrogen with a small amount of cyclohexane, is passed through a steam plant wherein cyclohexane is regenerated. This is accomplished, for example in the tubes in a shell and tube steam boiler supplied with a hydrogenation catalyst such as nickel or the like on the tube surface on the hydrocarbon side. The steam produced can be used to generate electricity or for process heating. By using excess hydrogen, platinum catalyst, and the cyclohexane-benzene mixture, radiation damage to the cyclohexane is minimized due to the protective action of benzene. Preferably, at least 99 percent pure cyclohexane is employed so that the degradation of cyclohexane to other products than benzene is substantially eleminated. A platinum catalyst can very readily dehydrogenate cyclohexane without excessive side reaction.

Preferably, the hydrogenation catalyst on the gas side of the steam boiler tubes is used to rehydrogenate the benzene back to cyclohexane using hydrogen produced in the dehydrogenation step within the reactor as well as the excesss hydrogen being recirculated. If the gas mixture is not cooled rapidly enough in the steam boiler to bring it into the hydrogenation temperature region, it can be recirculated in part to by-pass the nuclear reactor and mixed directly in with the benzene product leaving the nuclear reactor. Thus, the amount of by-pass material can be adjusted to cool the nuclear reactor effluent to a temperature where hydrogenation will occur selectively rather than dehydrogenation or cracking of unreacted cyclohexane. Suitable hydrogenation catalysts are well known in the art and include nickel, platinum, palladium and the like.

The above and other objects and features of the invention will be more fully appreciated from the following detailed description when read with the accompanying drawing which schematically illustrates an improved process for neutronic reactor cooling embodying the teachings of this invention.

In the present invention the nuclear reaction zone of a neutronic reactor is cooled by carrying out an endothermic process and using the heat absorption of the process to cool the reactor. A heterogeneous reactor, wherein solid fuel elements are arranged in an assembly in a reactor core is a preferred design for carrying out the process of the invention. However, it should be noted that the design and construction of a nuclear reactor, the core configuration, operation and control, are in no way a part in the present invention. Suitable neutronic reactors, including a reaction core comprising an assembly of fissile material in an amount sufficient to sustain a nuclear fission reaction and conduit means for supplying fluid cooling medium to and removing cooling medium from a reaction core, are well known and have been described in the voluminous literature available on that subject. The fissile material can be contained in fixed fuel elements of any suitable design such as rods, bars, plates and the like. By fissile material is meant those isotopes capable of sustaining a nuclear chain reaction by capture of a neutron and release of further neutrons. Examples are uranium 235 and 233 and plutonium 239. The fuel incorporating this fissile material can comprise the elements of the same atomic numbers as those isotopes containing the natural proportion of fissile material or the elements can be enriched with the fissile material to any desired extent. Such fuel can exist as a pure element or mixture of the fissile material-containing elements or can be in the form of compounds, oxides, carbides, alloys, as with aluminum, zirconium or clad with aluminum, zirconium, stainless steel or other alloys as known in the art. While solid fuels are preferred the fuel can be in liquid or gaseous form as long as it is suitably contained for the application of a surface coating of catalyst. Suitable nuclear fuel can also be combined with moderating material such as carbon, beryllium or water, ordinary or heavy. The moderating material can be physically or chemically associated with the fuel or can exist separately within the fuel element as desired.

Various types of neutronic reactors can be cooled in accordance with the present invention. These can be reactors primarily designed as powerful neutron and gamma ray sources, reactors designed for isotope production by exposure to reactor generated neutrons, or reactors to be utilized as sources of power in useful form. A suitable neutronic reactor is disclosed in U.S. Patent 2,708,656, issued to E. Fermi et al.

The present process providing novel neutronic reactor cooling involves carrying out an endothermic process with a hydrocarbon and using the heat absorption of the process to cool the reactor. Suitable hydrocarbon cooling mediums are naphthenes which can be catalytically dehydrogenated on the surface of the fuel elements or the assembly of fissile material to make aromatics. Most advantageously, this cooling system consists of a benzene-cyclohexane-hydrogen mixture. Such a mixture is self-regulating in nature.

Referring now to the drawing, a neutronic reactor 2 of conventional design is shown schematically as having an input cooling conduit 3 and output conduit 5 for circulating a fluid cooling medium through the reaction core (not shown). Coolant leaving the reactor is carried by line 7 through the tubes in a conventional shell and tube steam boiler 4 supplied with a hydrogenation catalyst on the tube surface on the hydrocarbon side. Steam produced is removed through line 9 and can be used to generate electricity or for process heating. Fresh water is supplied to the steam boiler by line 11. In the specific embodiment illustrated, the endothermic-exothermic coolant system is put into operation by supplying pure cyclohexane and hydrogen through line 13, for example, into the circulation system illustrated. A blower 6 is used to recirculate the hydrogen-hydrocarbon mixture and is located on the downstream side of the steam boiler so that most of the hydrogen that takes part in the reaction is actually bound up as cyclohexane during the pumping step. This minimizes the number of moles of material that have to be recirculated. The cooled fluid medium is pumped through line 15 to input conduit 3 opening into the reaction core of the neutronic reactor.

In instances where the gas mixture is not cooled rapidly enough in the steam boiler to bring it into the hydrogenation temperature region, control is obtained by passing a part of the recirculated cyclohexane through line 17 to by-pass the nuclear reactor and mixing it directly in with the benzene product leaving the reactor. The amount of by-pass material can be adjusted by means of valve 8 to cool the nuclear reactor effluent to a temperature where hydrogenation will occur selectively rather than dehydrogenation or cracking of unreacted cyclohexane. Preferably the dehydrogenation catalyst used in the nuclear reactor will be a platinum catalyst and contain no acid centers, chlorides or fluorides and the cracking activity can be further inhibited if necessary by the addition of small amounts of ammonia or other basic materials through line 13 into the system.

As stated above, one major advantage of the present cooling system is its self-regulating nature. As long as the benzene-cyclohexane-hydrogen mixture is being circulated the following things will happen. If the fuel elements tend to overheat in the nuclear reactor, the dehydrogenation reaction rate will increase and heat will be absorbed faster by the gas due to the endothermic dehydrogenation reaction. In the same way this heat will be released in the steam boiler by the increased concentration of benzene in the mixture giving more hydrogenation over the nickel catalyst. On the other hand if the nuclear reactor operates at a suddenly reduced power level the cooling of the fuel elements will tend to give less dehydrogenation reaction in the nuclear reactor, thus the surprising overall effect of this system is to maintain the fuel elements at constant temperature.

The novel features which are believed to be characteristic of the invention both as to its organization and method of operation will be understood more clearly and fully from the description below considered in connection with the following example.

Generally the concentration of fissile material in a nuclear reactor is in the range of 1,000 to 6,000 gm./cu. ft. The amount of moderator present is on the average of 30 to 75 lbs./cu. ft. Such a reactor can operate at any desired level usually at a rate wherein the fissile material burnup expressed as uranium 235 is in the range of 0.01 to 3 gm./cu. ft./day. The coolant flow rate will normally be in the range of 50 to 500 lbs./hr./gram of fissile material. Under these conditions the average flux of neutrons having energy greater than 100 electron volts will be in the range of $10^3$ to $5 \times 10^{14}$ per square centimeter per second and the associated gamma irradiation will be in the range of $10^6$ to $5 \times 10^7$ roentgens per hour. In the power generation process the coolant will have an exit temperature in the range of 400° to 1000° F. or more and an inlet temperature in the range of 250° to 950° F.

The novel cooling system of the present invention can be employed, for example, with a reactor core comprising 300 fuel elements 6 ft. long located on 3½ inch centers in a conventional square pattern. A suitable fuel element comprises a stainless steel conduit 2¼ inches across with 0.050 inch thick plates of uranium 235 encased in stainless steel 0.080 inch apart. The total amount of uranium 235 in the fuel elements is 250 kg. The free area in each fuel element for the passage of the fluid cooling medium is 2½ sq. inches. Reactor power level is 250,000 kw. heat, and the fuel burn-up rate is 0.25 gm./day. Average fuel element temperature is 950° F.

Each fuel element is coated with a platinum dehydrogenation catalyst in the following manner. High purity platinum in suitable form, such as wire, is fed to an electric arc sputtering device which is used to sputter a thin film of platinum particles on the surface of the stainless steel cladding of the fuel elements. The film is kept as thin as possible consistent with essentially complete coverage of the fuel element. As an alternate procedure the fuel element can be electroplated with platinum to form a thin film but this is less desirable than the sputtering technique because the sputtered surface has a somewhat higher catalytic activity.

Pure cyclohexane, that is with purity in excess of 99% can be circulated through the reactor core at a flow rate of $10^6$ lbs./hr. Coolant is admitted at a temperature of 750° F. and a pressure of 530 p.s.i.g. and is removed at a temperature of 900° F. and a pressure of 500 p.s.i.g. The cyclohexane vapor flows through the free area in each fuel element at the rate of 15 ft./sec. The heated coolant medium from the reactor is cooled by heat exchange with boiling water and steam which can be used in a turbo-electric generator to obtain about 75,000 kw. of electrical energy. The regenerated cyclohexane from the heat exchange hydrogeneration step is then returned by blower to the inlet of the reactor.

It is to be understood that the above-described arrangement and techniques are but illustrative of the applications of the principles of the invention. Numerous other arrangements and procedures may be devised by those skilled in the art without departing from the spirit and scope of the invention.

What is claimed is:

1. An improved process for generating power from a neutronic reactor including a nuclear reaction zone comprising an assembly of fuel elements and conduit means for supplying a cooling medium to said zone and for withdrawing said cooling medium to a steam boiler, the surface of said fuel elements being coated with a dehydrogenation catalyst, which comprises supplying cyclohexane to said reaction zone to cool said fuel elements, catalytically dehydrogenating cyclohexane on the surface of said fuel elements in contact with said dehydrogenation catalyst to produce benzene therefrom, removing benzene with hydrogen and unreacted cyclohexane from said zone to a steam boiler, and hydrogenating said benzene in said steam boiler in heat exchange relationship with water.

2. A process in accordance with claim 1 wherein said dehydrogenation catalyst is selected from the group consisting of platinum, palladium, nickel and platinum-alumina.

3. A process in accordance with claim 1 wherein said benzene is hydrogenated in said steam boiler in the presence of a catalyst selected from the group consisting of nickel, platinum and palladium.

4. A method for removing heat from a neutronic reactor including a reaction zone containing an assembly of fuel elements which comprises supplying to said reaction zone a stream of fluid cooling medium consisting essentially of cyclohexane, in heat exchange relationship with said reaction zone, catalytically dehydrogenating said cyclohexane on the surface of said fuel elements to benzene and hydrogen, withdrawing said cooling medium from said reaction zone, hydrogenating said benzene in a heat exchange zone and recovering heat from said heat exchange zone.

5. A method for removing heat from a neutronic reactor including a reaction zone containing an assembly of fuel elements which comprises supplying to said reaction zone a stream of fluid cooling medium consisting of cyclohexane, benzene and hydrogen in heat exchange relationship with said reaction zone, catalytically dehydrogenating said cyclohexane on the surface of said fuel elements to benzene and hydrogen, withdrawing said cooling medium from said reaction zone, hydrogenating said benzene in a heat exchange zone and recovering heat from said heat exchange zone.

6. A method for removing heat from a neutronic reactor including a reaction zone containing an assembly of fuel elements which comprises supplying to said reaction zone a stream of fluid cooling medium consisting of cyclohexane, benzene and hydrogen in heat exchange relationship with said reaction zone, said fluid cooling medium containing at least 99 percent cyclohexane, catalytically dehydrogenating said cyclohexane on the surface of said fuel elements to benzene and hydrogen, withdrawing said cooling medium from said reaction zone, hydrogenating said benzene in a heat exchange zone and recovering heat from said heat exchange zone.

7. A method for removing heat from a neutronic reactor including a reaction core comprising an assembly of fissile material in amounts sufficient to sustain a nuclear fission reaction and conduit means for supplying fluid cooling medium to and removing cooling medium from said reaction core, said assembly having a surface coating of a dehydrogenation catalyst, supplying a cooling medium consisting essentially of cyclohexane to said core to cool said fissile material, catalytically converting said cyclohexane to benzene by contact with said surface coating, withdrawing said benzene and unconverted cyclohexane from said core and hydrogenating said benzene in the presence of hydrogen, unreacted cyclohexane and a hydrogenation catalyst to regenerate cyclohexane, and recovering heat from the exothermic reaction.

8. A method for recovering heat from a neutronic reactor including a reaction core comprising an assembly of fissile material in an amount sufficient to sustain a nuclear fission reaction and conduit means for supplying fluid cooling medium to and recovering fluid cooling medium from said reaction core which comprises supplying a stream consisting essentially of cyclohexane to said core, catalytically dehydrogenating said cyclohexane on a surface of said assembly of fissile material to produce benzene and hydrogen therefrom, removing said benzene with hydrogen and unreacted cyclohexane from said core, hydrogenating said benzene and recovering heat in a heat exchange zone.

9. A method for recovering heat from a neutronic reactor including a reaction core comprising an assembly of fissile material in an amount sufficient to sustain a nuclear fission reaction and conduit means for supplying fluid cooling medium to and recovering fluid cooling medium from said reaction core which comprises supplying a stream consisting of cyclohexane, benzene and hydrogen to said core, catalytically dehydrogenating said cyclohexane on a surface of said assembly of fissile material to produce benzene and hydrogen therefrom and removing said benzene with hydrogen and unreacted cyclohexane from said core, recovering heat from the coolant by hydrogenating said benzene in a heat exchange zone.

10. A method for removing heat from a neutronic reactor including a reaction zone containing an assembly of fuel elements which comprises supplying to said reaction zone a stream of fluid cooling medium comprising cyclohexane in heat exchange relationship with said reaction zone, catalytically dehydrogenating said cyclohexane on the surface of said fuel elements to benzene and hydrogen, withdrawing said cooling medium from said reaction zone, recovering heat from said cooling medium withdrawn from said reaction zone by hydrogenation of at least part of the benzene content thereof in heat exchange relationship with a second cooling medium, at least a portion of the material so hydrogenated being returned to said reaction zone to repeat the cycle.

11. The method of claim 10 wherein said cooling medium circulated to said reaction zone is repressurized after the hydrogenation step but before it enters the reaction zone.

12. A method for the transfer of heat comprising the steps of heating cyclohexane to undergo a catalytic dehydrogenation endothermic reaction to a temperature level at which the endothermic reaction occurs by passing said cyclohexane in heat exchange relationship with a source of heat, absorbing heat from the source of heat as the endothermic reaction occurs and produces benzene and hydrogen, cooling said benzene and hydrogen to a temperature level at which a catalytic exothermic reaction occurs to form cyclohexane, and heating a material by passing it in heat exchange relationship with said benzene and hydrogen as the exothermic reaction occurs and evolves heat.

References Cited by the Examiner

UNITED STATES PATENTS

| | | | |
|---|---|---|---|
| 2,397,899 | 4/46 | Witkiewicz. | |
| 2,655,786 | 10/53 | Carr | 62—4 |
| 2,743,223 | 4/56 | McClinton et al. | 204—158.1 |
| 2,905,610 | 9/59 | Wigner | 204—162.1 X |
| 2,943,986 | 7/60 | Thorpe et al. | 204—154 |
| 3,067,594 | 12/62 | Bland | 62—4 |

FOREIGN PATENTS 800,851  9/58  Great Britain.

OTHER REFERENCES

Atomic Energy Commission Document LRL 86, Dissociation Cooling, October 8, 1954, pp. 5, 6 and 17–19.

Wertheim: Textbook of Organic Chemistry, 2nd ed., The Blakiston Co., Phila., 1945, page 617.

Gregory: "Uses and Application of Chemical and Related Materials," vol. II, Reinhold Publ. Co., New York (1944), page 353.

NORMAN YUDKOFF, *Primary Examiner.*

GEORGE D. MITCHELL, LEON ROSDOL, ROGER CAMPBELL, *Examiners.*